(12) United States Patent
Namiki et al.

(10) Patent No.: US 12,734,678 B2
(45) Date of Patent: Sep. 15, 2026

(54) TEACHING DEVICE, MARKER MEASURING METHOD, AND PROGRAM

(71) Applicant: FANUC CORPORATION, Yamanashi (JP)

(72) Inventors: Yuta Namiki, Yamanashi (JP); Yuutarou Takahashi, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 111 days.

(21) Appl. No.: 18/550,289

(22) PCT Filed: May 28, 2021

(86) PCT No.: PCT/JP2021/020534
§ 371 (c)(1),
(2) Date: Sep. 13, 2023

(87) PCT Pub. No.: WO2022/249481
PCT Pub. Date: Dec. 1, 2022

(65) Prior Publication Data
US 2024/0308061 A1 Sep. 19, 2024

(51) Int. Cl.
*B25J 9/00* (2006.01)
*B25J 9/16* (2006.01)
*B25J 19/02* (2006.01)
*G05B 19/409* (2006.01)
*G05B 19/42* (2006.01)

(52) U.S. Cl.
CPC .......... *B25J 9/0081* (2013.01); *B25J 19/023* (2013.01)

(58) Field of Classification Search
CPC ...... B25J 9/0081; B25J 19/023; B25J 9/1656; G05B 19/42; G05B 2219/39438; G05B 19/409
See application file for complete search history.

(56) References Cited

U.S. PATENT DOCUMENTS

2013/0287293 A1* 10/2013 Genc ...................... G06T 7/593 382/154
2022/0241033 A1* 8/2022 Sandelson .............. A61B 90/39

FOREIGN PATENT DOCUMENTS

| | | | | |
|---|---|---|---|---|
| CN | 108453701 | A | | 8/2018 |
| CN | 108994876 | A | | 12/2018 |
| JP | H04211807 | A | * | 8/1992 |
| JP | 08249026 | A | * | 9/1996 |
| JP | H08249026 | A | * | 9/1996 |
| JP | 2001318715 | A | * | 11/2001 |
| JP | 2007-160486 | A | | 6/2007 |
| JP | 2019-093533 | A | | 6/2019 |
| JP | 2020-072773 | A | | 5/2020 |
| JP | 2020-116717 | A | | 8/2020 |
| JP | 2020-163518 | A | | 10/2020 |
| WO | 2022249481 | A1 | | 12/2022 |

* cited by examiner

*Primary Examiner* — Harry Y Oh
(74) *Attorney, Agent, or Firm* — HAUPTMAN HAM, LLP

(57) ABSTRACT

Provided is a teaching device that is used to create a program for measuring, with a visual sensor, markers installed in a work space, the teaching device comprising a user interface creation unit that creates a user interface for inputting setting information pertaining to the measurement of a marker, wherein the user interface creation unit makes it possible to use first setting information input for a first marker in settings for a second marker in the user interface.

11 Claims, 9 Drawing Sheets

FIG. 2

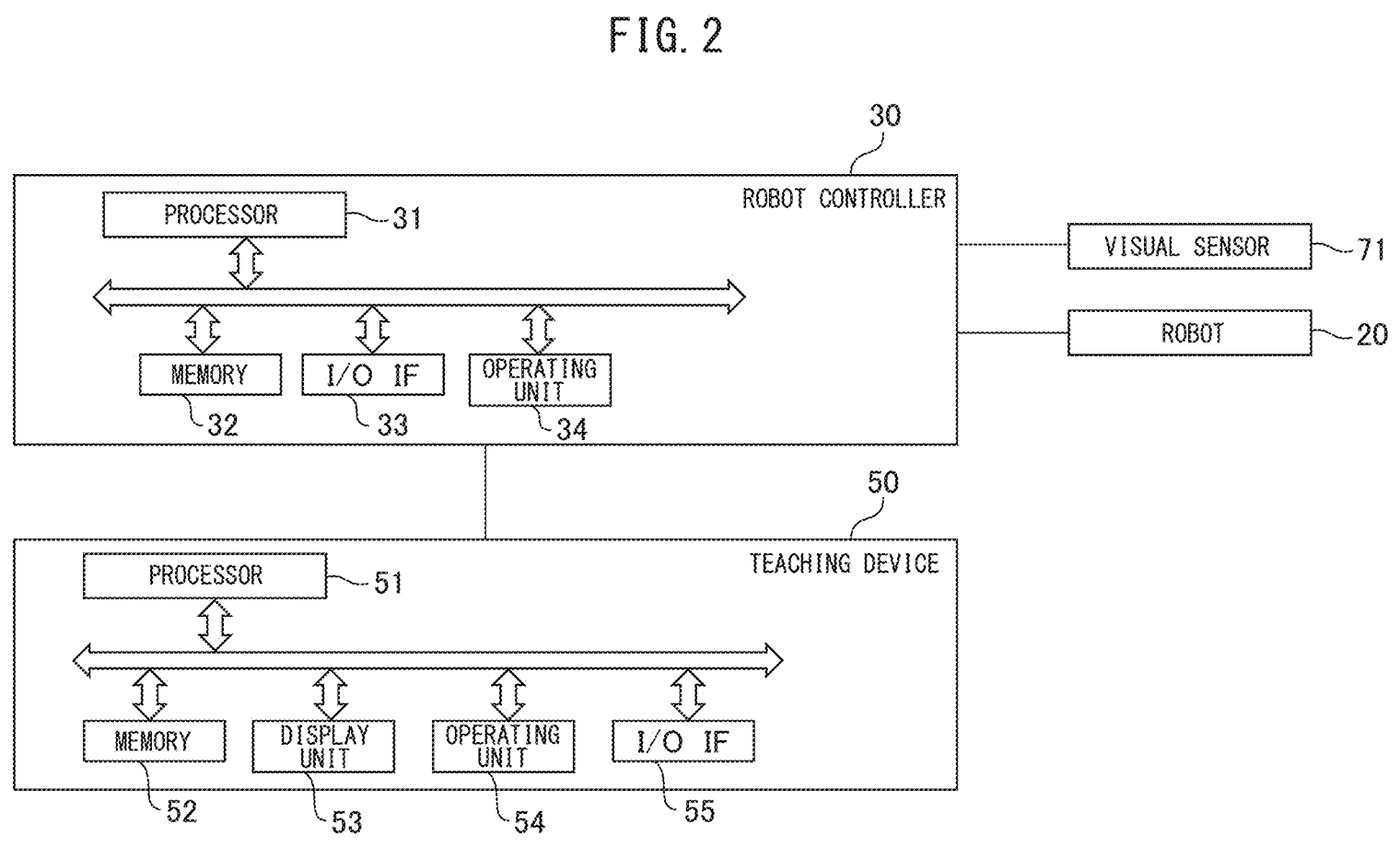

71 VISUAL SENSOR
20 ROBOT
30 ROBOT CONTROLLER
31 PROCESSOR
32 MEMORY
33 I/O IF
34 OPERATING UNIT
50 TEACHING DEVICE
51 PROCESSOR
52 MEMORY
53 DISPLAY UNIT
54 OPERATING UNIT
55 I/O IF

20
ROBOT
71
VISUAL SENSOR
30
ROBOT CONTROLLER
131
STORAGE UNIT
132
OPERATION CONTROL UNIT
133
MARKER POSITION MEASUREMENT UNIT
134
RELATIVE POSITION CALCULATION UNIT
135
MEASUREMENT ACCURACY EVALUATION UNIT
50
TEACHING DEVICE
151
PROGRAM CREATION UNIT
152
MARKER UI CREATION UNIT
153
MARKER SETTING INPUT RECEPTION UNIT
154
SETTING UNIT
53
DISPLAY UNIT
54
OPERATING UNIT

FIG. 4
Y-AXIS
X-AXIS
144
4
145
145
142
141
143
FIG. 5
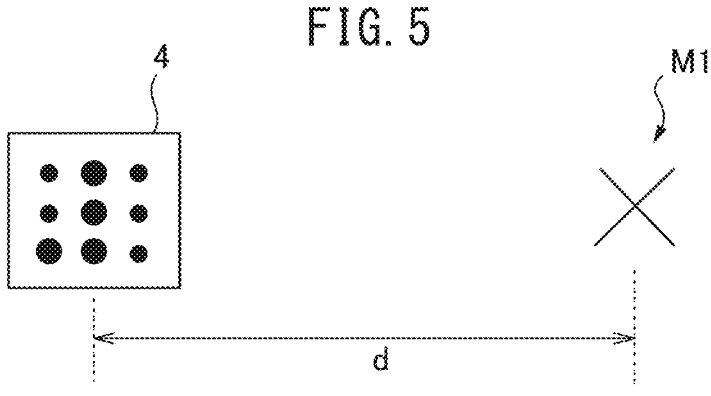
FIG. 6
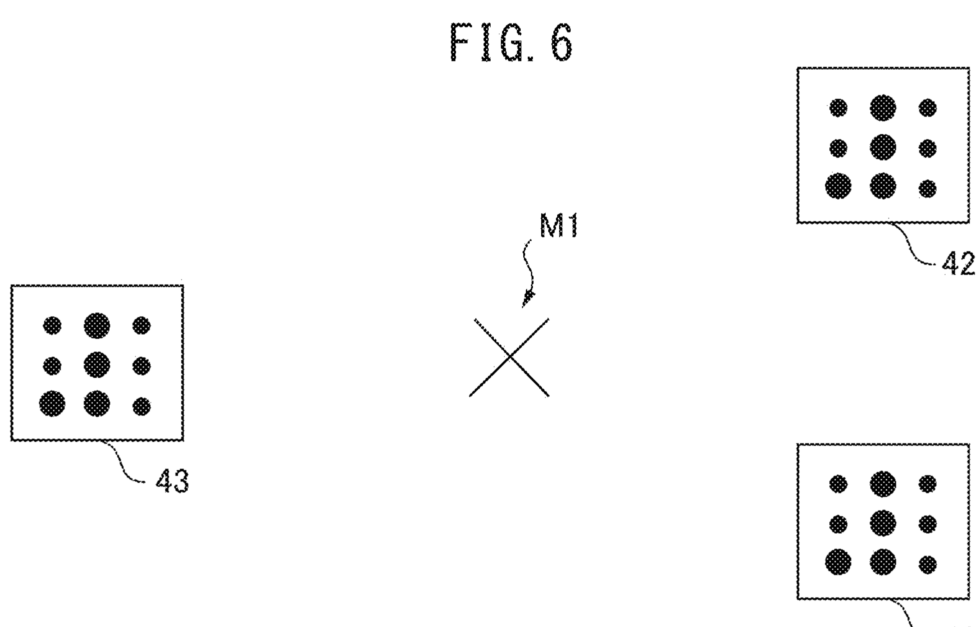

START

MEASURE FIRST MARKER — S1

EVALUATE MEASUREMENT ACCURACY OF ONE MARKER — S2

ACCURACY IS GOOD? — S3

OK → END

NG

MEASURE SECOND MARKER — S4

MEASURE THIRD MARKER — S5

COMBINE MEASUREMENT RESULTS, AND OBTAIN RELATIVE POSITION BETWEEN ROBOT AND WORKSPACE — S6

END

FIG. 13
FIG. 14A
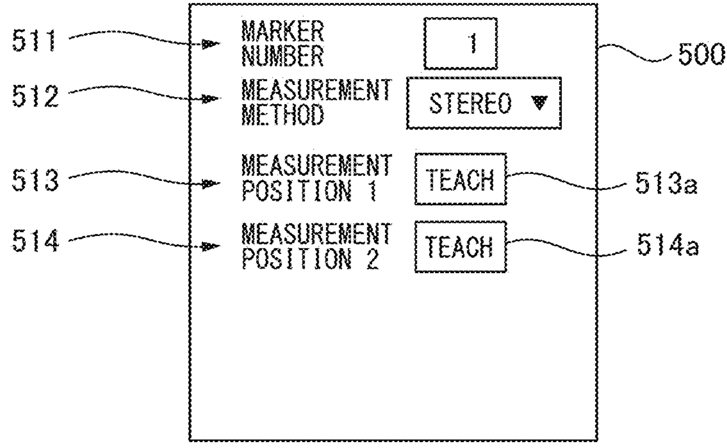
FIG. 14B
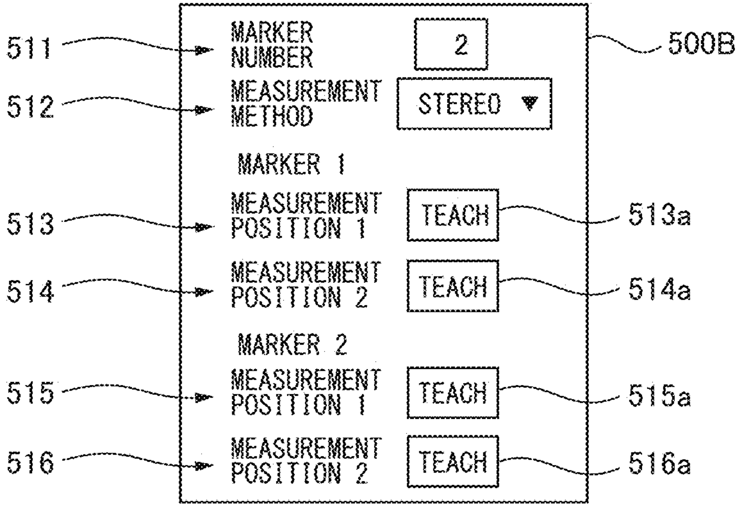

TEACHING DEVICE, MARKER MEASURING METHOD, AND PROGRAM

RELATED APPLICATIONS

The present application is a National Phase of International Application No. PCT/JP2021/020534 filed May 28, 2021.

FIELD

The present invention relates to a teaching device.

BACKGROUND

An automated system for performing work by moving a robot mounted on a platform car or an automated guided vehicle (AGV), and stopping the robot in front of a workspace such as a machine tool has been proposed.

In such an automated system, when the robot performs various items of work such as loading/unloading of a processed target into and from the machine tool, a stopping position of the platform car or the AGV on which the robot is mounted changes for each movement. Thus, it is insufficient for the robot to only perform the same operation every time, and it is necessary to measure a deviation of a stopping position of the platform car or the AGV from the machine tool, and correct an operation of the robot such that work can be correctly performed on the workspace. Therefore, by attaching a camera on a tip of the robot and measuring a marker attached to the workspace, a position relationship between the robot and the workspace such as the machine tool can be measured, a positional deviation corrected, and the robot operated correctly.

As one technique for obtaining a relative position between a robot and a workspace, PTL 1 describes a configuration for "measuring a reference (6) provided in work coordinates by a reference position detector (4) at an end of a robot, estimating an installation error from a difference between a measurement position of a reference by robot coordinates and a position of the premeasured reference in the work coordinates, and controlling the robot by correcting the installation error" (Abstract).

Further, PTL 2 describes a configuration "as a robot surgical operation system 100 that can include one or a plurality of markers 118 configured to track a three-dimensional movement of a robot arm 104, an end effector 112, a patient 210, and/or a surgical instrument 608" (paragraph [0050]).

CITATION LIST

Patent Literature

[PTL 1] Japanese Unexamined Patent Publication (Kokai) No. H4-211807 A

[PTL 2] Japanese Unexamined Patent Publication (Kokai) No. 2020-72773 A

SUMMARY

Technical Problem

When measuring a marker installed in a workspace by means of a camera attached to a tip of a robot, it should ideally be possible to correct a position of the robot by detecting one marker, from the viewpoint of cycle time and the number of man-hours required to perform teaching positions and postures to the robot. However, necessary accuracy may not be acquired in position correction by measurement using only one marker. In such a case, accuracy of position correction can be improved by measuring a plurality of markers. However, when a measurement method and a teaching procedure differ between when measurement is performed with one marker and measurement is performed with a plurality of markers, work required in order to increase the number of markers and improve accuracy is difficult and time-consuming.

Solution to Problem

An aspect of the present disclosure is a teaching device used for creating a program for measuring a marker installed in a workspace by a visual sensor, and the teaching device includes a user interface creation unit configured to create a user interface for inputting setting information on measurement of the marker, wherein the user interface creation unit is configured to set first setting information input for a first marker to be usable in setting related to a second marker in the user interface.

Another aspect of the present disclosure is a marker measurement method for measuring a marker installed in a workspace by a visual sensor, and the marker measurement method includes: performing measurement on a first marker; evaluating accuracy of a measurement result of the first marker; and performing measurement on one or more additional markers when accuracy of a measurement result of the first marker is less than a predetermined level, wherein setting information on measurement of the first marker is usable as setting information on each measurement of the one or more additional markers.

Still another aspect of the present disclosure is a program causing a computer to execute: an operation of providing a user interface that receives an input of first setting information on measurement of a first marker, and receives an input of second setting information on measurement of a second marker by a method capable of using the first setting information being input for the first marker.

Advantageous Effects of Invention

According to the configuration described above, in a situation where measurement of a plurality of markers is needed, a user can also easily perform setting of the measurement of the plurality of markers by a method similar to that when setting of measurement of one marker is performed.

The objects, the features, and the advantages, and other objects, features, and advantages of the present invention will become more apparent from the detailed description of typical embodiments of the present invention illustrated in accompanying drawings.

BRIEF DESCRIPTION OF DRAWINGS

FIG. 2 is a diagram illustrating a hardware configuration example of a robot controller and a teaching device.

FIG. 4 is a diagram illustrating an example of a marker used in the present embodiment.

FIG. 5 is a diagram illustrating one marker installed in a workspace and a teaching position needed to be corrected.

FIG. 6 is a diagram illustrating three markers installed in the workspace and a teaching position needing to be corrected.

FIG. 13 is a diagram illustrating a program for adding a way point between the single-marker measurement icons when measurement is performed with three markers.

FIG. 14A is a diagram illustrating a marker setting input screen for measuring one marker being provided by a setting unit.

FIG. 14B is a diagram illustrating a marker setting input screen for measuring two markers being provided by the setting unit.

DESCRIPTION OF EMBODIMENTS

Figure 1:
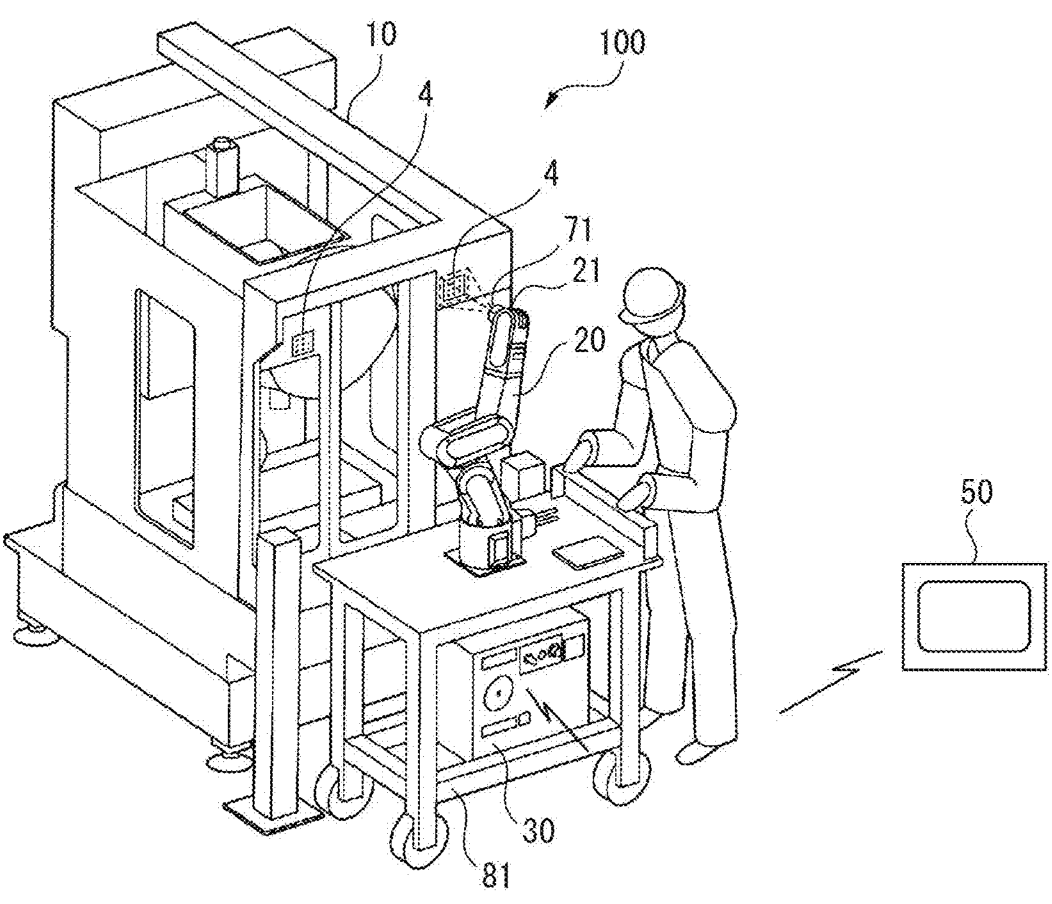
FIG. 1 is a diagram illustrating an apparatus configuration of a robot system including a teaching device according to one embodiment.

Next, embodiments of the present disclosure will be described with reference to drawings. A similar configuration portion or a similar functional portion is denoted by the same reference sign in the referred-to drawings. Scale is appropriately changed in the drawings in order to facilitate understanding. An aspect illustrated in the drawing is one example for implementing the present invention, and the present invention is not limited to the illustrated aspect.

FIG. 1 is a diagram illustrating an apparatus configuration of a robot system 100 including a teaching device 50 according to one embodiment. The robot system 100 includes a machine tool 10, an industrial robot (hereinafter described as a robot) 20, a robot controller 30 that controls the robot 20, and a conveyance device 81 for conveying the robot 20 and the robot controller 30. The robot 20 is disposed in a predetermined position in front of the machine tool 10 while the robot 20 is mounted on the conveyance device 81, and performs predetermined work for loading/unloading a work target (hereinafter described as a workpiece) into and from the machine tool 10, and the like. In other words, the robot system 100 is formed as an automated system for automating loading/unloading of a workpiece into and from the machine tool 10 by the robot 20.

In FIG. 1, the robot 20 is described as a vertical articulated robot, but a robot of another type may be used. The conveyance device 81 is, for example, a platform car or an automated guided vehicle (AGV).

The teaching device 50 is connected to the robot controller 30 in a wireless or wired manner, and is used for teaching the robot 20 (for creating a control program of the robot 20). Note that, during actual operation of the robot system 100, the control program created by using the teaching device 50 is registered in the robot controller 30, and thus the teaching device 50 may be omitted from the robot system 100.

In the robot system 100 as in FIG. 1, when the robot 20 performs work for loading/unloading a workpiece, and the like, a position of the conveyance device 81 on which the robot 20 is mounted changes. Therefore, the robot 20 needs to be configured in such a way as to be able to measure a position deviation of the robot 20 from the machine tool 10, and correctly perform work on the machine tool 10. Thus, a visual sensor 71 is mounted on an arm tip portion 21 of the robot 20, and the robot 20 (robot controller 30) is configured to perform work by detecting a position deviation of the robot 20 from a workspace (machine tool 10) by using the visual sensor 71, and correcting the position deviation.

The teaching device 50 provides a function of creating a program (hereinafter, such a program is also referred to as a measurement program) for measuring a three-dimensional position of a marker 4 installed in a predetermined position of the workspace (machine tool 10) by the visual sensor 71 mounted on the arm tip portion 21 of the robot 20, and measuring a position deviation of an expected position of the robot 20 from the workspace. The control program including the measurement program created by using the teaching device 50 is registered in the robot controller 30, and, hereinafter, the robot 20 (robot controller 30) can operate in such a way as to perform predetermined work by detecting a position deviation of an expected position of the robot 20 from the workspace and performing position correction.

The visual sensor 71 may be a two-dimensional camera, or may be a three-dimensional position detector. In the present embodiment, the visual sensor 71 is assumed to be a two-dimensional camera. The visual sensor 71 is connected to the robot controller 30. In the present embodiment, the robot controller 30 is assumed to have a function of controlling the visual sensor 71, a function of performing various types of image processing on an image captured by the visual sensor 71, and the like. Further, calibration data including data indicating a position of the visual sensor 71 with reference to the robot 20 are assumed to be stored in advance in a memory 32 of the robot controller 30.

FIG. 2 is a diagram illustrating a hardware configuration example of the robot controller 30 and the teaching device 50. The robot controller 30 may have a configuration as a general computer in which the memory 32 (such as a ROM, a RAM, and a non-volatile memory), an input/output interface 33, an operating unit 34 including various operation switches, and the like are connected to a processor 31 via a bus. The teaching device 50 may have a configuration as a general computer in which a memory 52 (such as a ROM, a RAM, and a non-volatile memory), a display unit 53, an operating unit 54 formed of an input device such as a keyboard (or a software key), an input/output interface 55, and the like are connected to a processor 51 via a bus. Note that a teach pendant, a tablet terminal, a smartphone, a personal computer, and other various information processing devices can be used as the teaching device 50.

Figure 3:
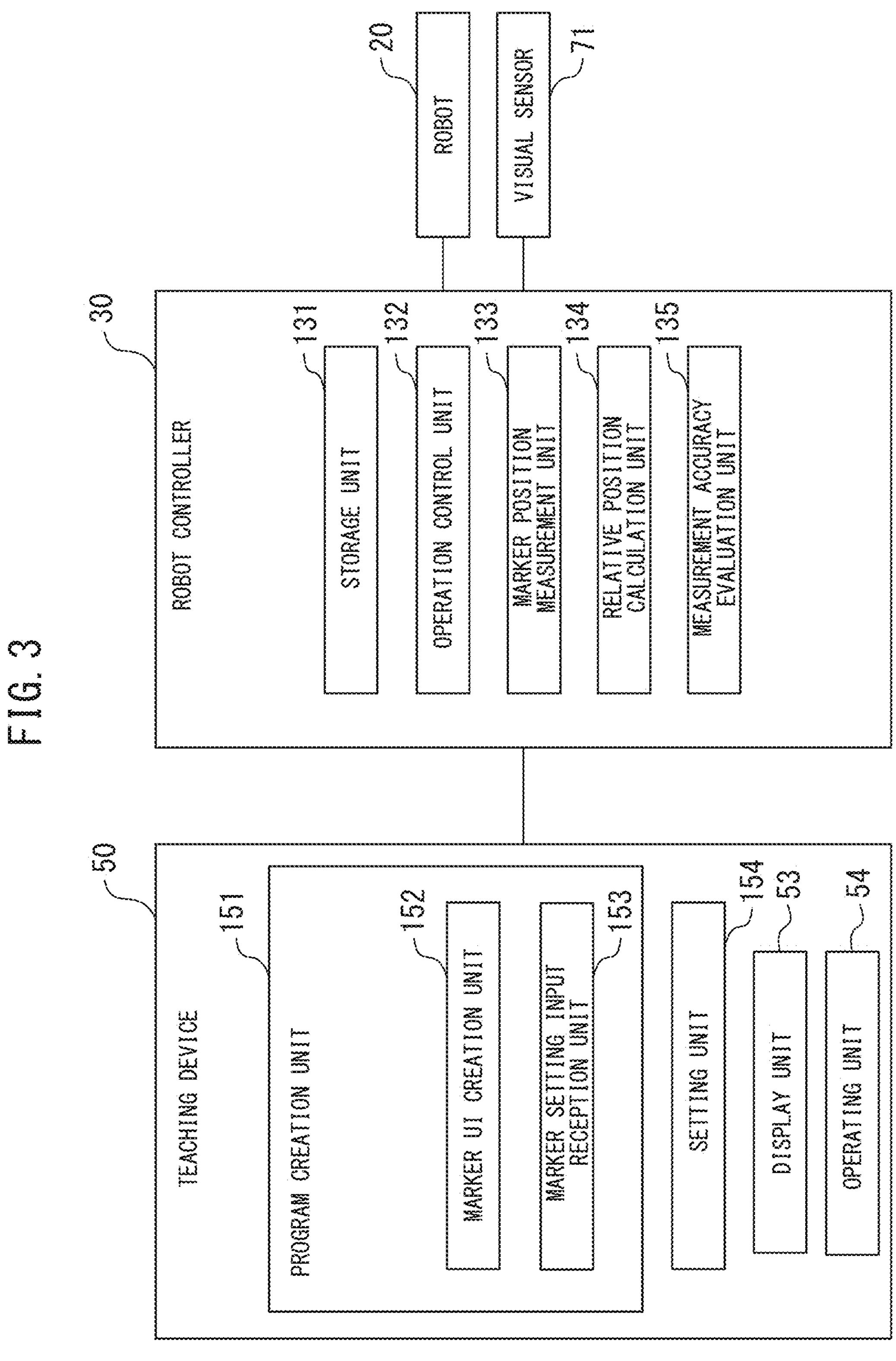
FIG. 3 is a functional block diagram of the teaching device and the robot controller.

FIG. 3 is a functional block diagram of the teaching device 50 and the robot controller 30. The teaching device 50 is a device for creating a control program by using a command for controlling the robot 20. In the present embodiment, as an exemplification, the teaching device 50 is assumed to be a device that can perform programming by using an icon representing a command. The teaching device 50 includes a program creation unit 151 for creating a control program, and a setting unit 154 for inputting various types of setting related to teaching of the robot 20. The program creating unit 151 includes a marker UI creation unit 152 that creates a user interface (UI) for receiving an input of setting related to measurement of a marker, and a marker setting input reception unit 153 that receives a setting input operation of a marker via the UI. Note that the UI for marker setting is achieved by using functions of the display unit 53 and the operating unit 54.

The setting unit 154 presents a UI screen for performing an input of various types of setting (for example, setting of a tool coordinate system) related to teaching of the robot 20, and receives an input of setting. The various types of input setting are stored in the storage unit (memory 52) of the teaching device 50.

As illustrated in FIG. 3, the robot controller 30 includes a storage unit 131 that stores a control program and other various types of information, an operation control unit 132 that controls an operation of the robot 20 according to the control program, a marker position measurement unit 133, a relative position calculation unit 134, and a measurement accuracy evaluation unit 135.

The marker position measurement unit 133 measures a three-dimensional position of the marker 4 by using the visual sensor 71. In the present embodiment, as one example, the marker position measurement unit 133 performs position measurement of the marker 4 by a stereo measurement method by using the visual sensor 71 as a two-dimensional camera. In other words, the marker position measurement unit 133 captures the same marker 4 from two different positions by changing a position of the visual sensor 71 formed of the two-dimensional camera, and calculates a three-dimensional position of the marker 4. This technique has an advantage in that a position measurement system can be achieved at a low cost by using a relatively inexpensive two-dimensional camera. Note that another technique known in the field for measuring a position of a marker (also referred to as a target mark and a visual marker) may be used.

The storage unit 131 stores calibration data indicating a position of the two-dimensional camera (visual sensor 71) with reference to a coordinate system (mechanical interface coordinate system) set in the arm tip portion 21 of the robot 20. Meanwhile, the robot controller 30 (marker position measurement unit 133) can recognize a position and a posture of the arm tip portion 21 during an operation of the robot 20. Therefore, the robot controller 30 (marker position measurement unit 133) can associate a sensor coordinate system and a robot coordinate system during capturing of the two-dimensional camera (visual sensor 71) by converting the mechanical interface coordinate system into the robot coordinate system according to an operation of the robot 20. In this way, in the marker position measurement unit 133, a position of a target (marker 4) can be obtained as a three-dimensional position in the robot coordinate system.

The relative position calculation unit 134 obtains a relative position (i.e., a deviation amount of an expected position of the robot 20 from the workspace) between the workspace (machine tool 10) and the robot 20, based on the measured marker position.

The operation control unit 132 controls the robot 20 in such a way that the robot 20 performs work in correct position and posture being corrected from prescribed position and posture, based on the calculated relative position relationship (deviation amount of the expected position of the robot 20 from the workspace) between the workspace and the robot.

The measurement accuracy evaluation unit 135 has a function of evaluating accuracy of a measurement result in which the marker position measurement unit 133 measures a position of one marker 4.

Note that the function related to marker position measurement by the marker position measurement unit 133, the relative position calculation unit 134, and the measurement accuracy evaluation unit 135 can be achieved by registering, in the storage unit 131 of the robot controller 30, a measurement program related to the marker position measurement created by using the teaching device 50, and executing the measurement program by the processor 31 of the robot controller 30.

FIG. 4 illustrates an example of the marker 4 used in the present embodiment. The marker 4 in the present example has a dot pattern as illustrated in FIG. 4. In the marker illustrated in FIG. 4, large dots 141 to 144 indicate a coordinate system (marker coordinate system) being set in the marker 4. The dot 141 indicates an origin in the marker coordinate system, the dots 141 to 142 represent an X-axis in the marker coordinate system, and the dots 141 and 143 to 144 represent a Y-axis in the marker coordinate system. A Z-axis is a normal direction with respect to a marker formation plane. When the robot controller 30 performs measurement of the marker 4 according to the measurement program, information on a dot interval of the marker 4 can be used as known information. Therefore, the robot controller 30 (the marker position measurement unit 133 and the relative position calculation unit 134) can obtain a position and a posture of the marker coordinate system being set in the marker 4 by measuring each dot of the marker 4. Note that a position and a posture of such a marker 4 can be obtained from one measurement by the visual sensor 71 (two-dimensional camera), and can be obtained by the stereo measurement method. As described above, in the present embodiment, a case where the position and the posture are obtained by the stereo measurement method is described. Further, in the present embodiment, a case where the marker 4 having the shape as illustrated in FIG. 4 is used is described, but a marker having any shape can be used as a marker being a measurement target. When a marker having any shape is used, the shape of the marker is taught via a user interface, and the like (a marker UI screen 220 described below, and the like) used for performing detailed setting related to marker measurement.

By measuring one marker 4 by the visual sensor, a three-dimensional position of the marker 4 with respect to the visual sensor 71 can be acquired, but sufficient accuracy may not be acquired from measurement of one marker. FIG. 5 illustrates one marker 4 installed in the workspace and a teaching position M1 needed to be corrected. When a distance d between the marker 4 and the teaching position M1 increases, a translation position after correction of the teaching position M1 tends to be adversely affected. The reason is that, in a case where the teaching position M1 is operated (corrected) as a position in the coordinate system with reference to the marker 4, when an error $\theta$ occurs in a posture of the marker 4, a deviation in a translation direction of $d \times \sin\theta$ may occur in a position after correction of the teaching position M1.

Thus, the robot controller 30 according to the present embodiment improves accuracy of correction of a teaching point by increasing the number of the markers 4 to be measured and by recognizing a coordinate system and a correction amount in such a way as to combine measurement results of the markers. As one example, as illustrated in FIG. 6, three markers 4 (a marker 41, a marker 42, and a marker 43) are disposed around the teaching position M1 needed to be corrected. Positions measured with the marker 41, the marker 42, and the marker 43 as separate markers are assumed to be P1, P2, and P3. The marker position measurement unit 133 recognizes a coordinate system by using the position P1 of the marker 41 as an origin position, the position P2 of the marker 42 as a position in an X-axis direction, and the position P3 of the marker 43 as a position on an XY plane. In this way, when a position and a posture of the coordinate system are recognized by using the plurality of markers 4, accuracy can be further improved than that in a case of measurement of one marker. Further, in this case, an error relating to a posture can be reduced by increasing a distance between markers.

Note that another technique known in the field may be used for combining results of measuring a plurality of markers and recognizing a position and a posture of the entire target (workspace in the present embodiment). For example, when measurement is performed at two points (two markers), a rotational amount with respect to a line connecting the two measured points as an axis cannot be identified. However, when the rotational amount rarely changes in terms of system accuracy, this technique can serve as a sufficiently practical one.

The measurement accuracy evaluation unit 135 has a function of evaluating a result of position measurement of the marker 4 by the marker position measurement unit 133. As one example, the measurement accuracy evaluation unit 135 performs an evaluation of a position measurement result of the marker 4 as follows. When a position in which each measurement point (each dot) in the marker 4 is measured is Pxi, a position (design value) of each measurement point with respect to an origin of the marker 4 is Pyi, and a position and a posture of the measured marker are Pm, $$\sum(Pxi - Pm \times Pyi)^{\wedge}2 \qquad (1)$$

is an index value representing a sum of squares of a measurement error of each measurement point, and accuracy of measurement may be evaluated by magnitude of the index value. Note that Pxi, Pm, and Pyi described above are a homogeneous transformation matrix. Note that measurement accuracy can also be evaluated by measuring the marker 4 from a plurality of viewpoints and synthetically evaluating measurement results thereof. For example, when measurement accuracy of the marker 4 is low, a variation may occur in measurement results from a plurality of viewpoints.

The marker position measurement unit 133 and the relative position calculation unit 134 may measure one marker 4 and obtain the index value described above, and, when accuracy of position measurement by one marker is low (for example, when an index value of an error by Expression (1) is greater than a predetermined threshold value), the number of the markers 4 to be measured may be increased (for example, measurement by three markers 4 may be performed). Further, the marker position measurement unit 133 and the relative position calculation unit 134 may measure one marker 4 and obtain the index value described above, and, when accuracy of measurement by one marker is determined to be sufficient (for example, when an index value of an error by Expression (1) is equal to or less than a predetermined threshold value), a relative position relationship between the robot 20 and the workspace may be obtained from measurement of one marker 4.

The teaching device 50 provides a programming function for achieving a marker measurement function as described above in the robot controller 30. Hereinafter, a program creation function in the teaching device 50 will be described.

Figure 7:
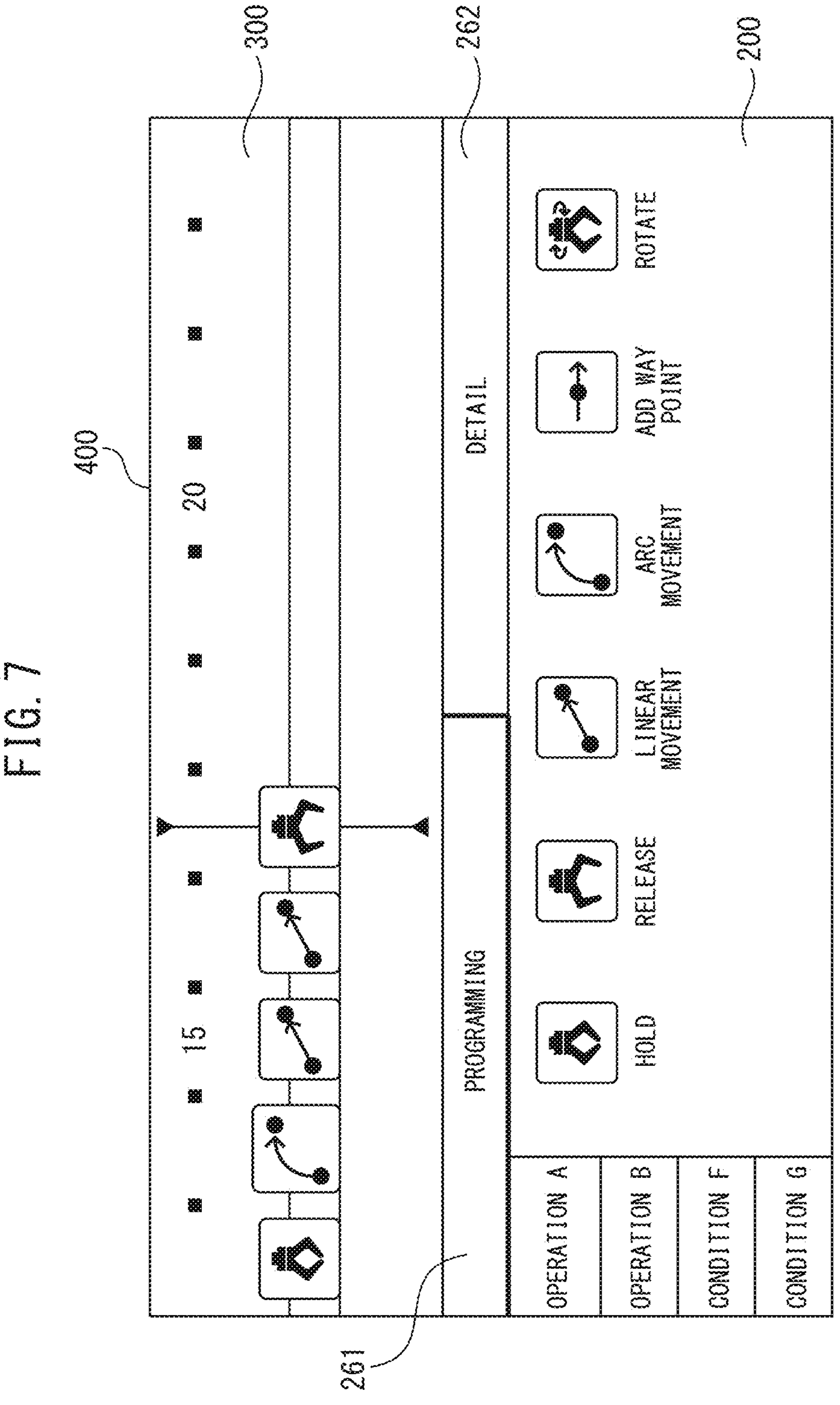
FIG. 7 is a diagram illustrating a basic configuration example of a program creation screen.

FIG. 7 is a diagram illustrating a basic configuration example of a program creation screen 400 generated by the program creation unit 151. The program creation screen 400 includes an icon display region 200 for displaying a list of icons that can be used for program creation, and a program creation region 300 for performing program creation by arranging a desired icon selected from the icon display region 200. A user performs programming by arranging a desired icon from the icon display region 200 in order in the program creation region 300 by, for example, a drag-and-drop operation. Further, by selecting an icon disposed in the program creation region 300 and selecting a detail tab 262, the user can perform detailed setting (teaching) on the currently selected icon.

Figure 8:
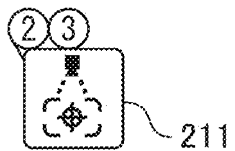
FIG. 8 is a diagram illustrating an icon of a command that performs measurement on one marker.

FIG. 8 is a diagram illustrating an icon (hereinafter described as a single-marker measurement icon 211) corresponding to a command that performs measurement on one marker. The single-marker measurement icon 211 provides a function of measuring a three-dimensional position of a marker by a visual detection function using the visual sensor 71, and calculating a relative position relationship between the robot 20 and the marker (i.e., workspace). Two numbers displayed above the single-marker measurement icon 211 represent that the single-marker measurement icon 211 includes setting of two teaching points. When the single-marker measurement icon 211 is disposed together with another icon in the program creation region 300, the two numbers above the single-marker measurement icon 211 each represent a number of the teaching point in a program. As an exemplification. FIG. 8 illustrates that the numbers of the two teaching points of the single-marker measurement icon 211 are second and third.

Figure 9:
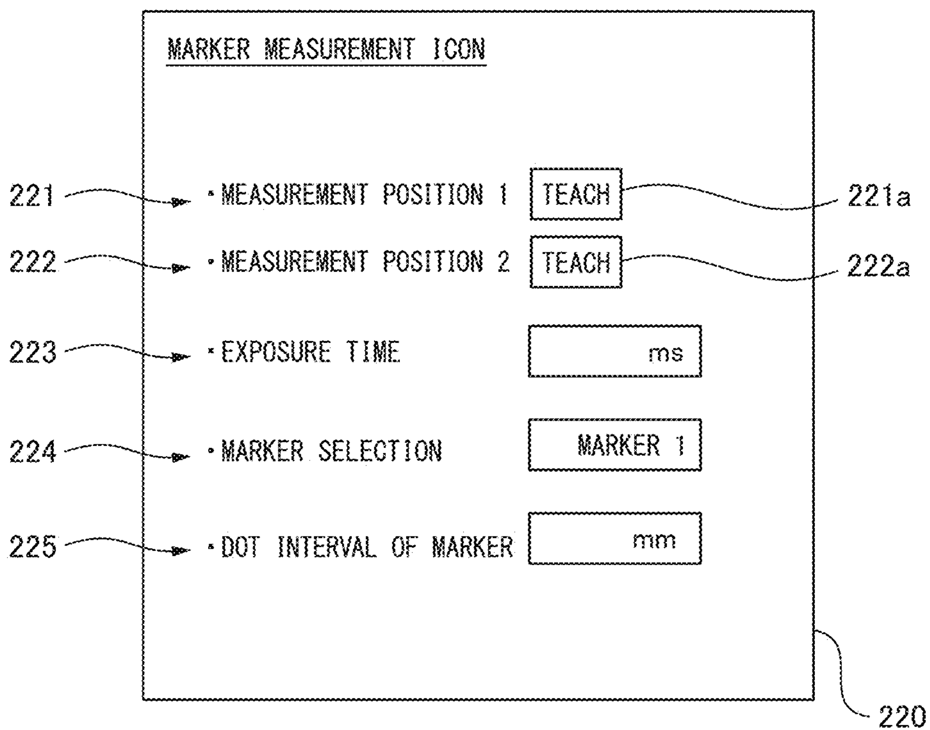
FIG. 9 is a diagram illustrating a configuration example of a marker UI screen for performing detailed setting of a single-marker measurement icon.

FIG. 9 is a diagram illustrating a configuration example of a marker user interface (UI) screen 220 for performing detailed setting of the single-marker measurement icon 211. The marker UI screen 220 is generated by the marker UI creation unit 152. The marker UI screen 220 may be activated and displayed by, for example, selecting the detail tab 262 while the single-marker measurement icon 211 disposed in the program creation region 300 is selected. As illustrated in FIG. 9, the marker UI screen 220 includes, as detailed setting items, setting input fields 221 to 225 of (1) measurement positions (measurement position 1, measurement position 2) at two places for stereo measurement, (2) exposure time of a visual sensor, (3) selection of a marker, and (4) a dot interval of a marker.

Note that default setting may be set in advance in the setting input fields 221 to 225.

When setting of the two measurement positions is performed, teaching buttons 221*a* and 222*a* are selected, the robot 20 is operated (jog-operated), and a measurement position (position of the visual sensor 71) is taught.

Figure 10:
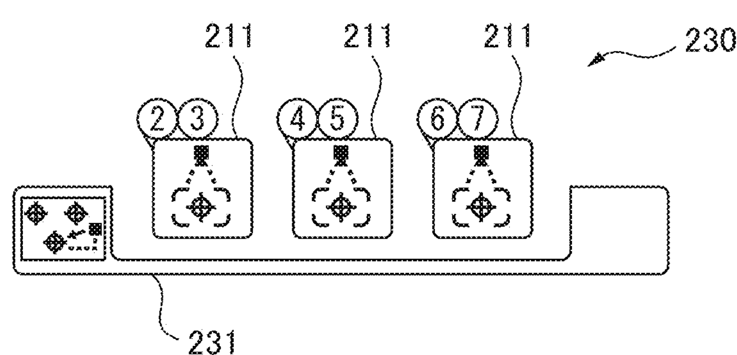
FIG. 10 is a diagram illustrating an icon corresponding to a command that performs measurement on three markers.

FIG. 10 illustrates an icon (hereinafter described as a three-marker measurement icon 230) for performing measurement on three markers. As described with reference to FIG. 6, the three-marker measurement icon 230 provides a function of performing measurement on three markers 4, and obtaining a relative position relationship between the robot 20 and the workspace. The three-marker measurement icon 230 can be simply formed by arranging three single-marker measurement icons 211 in a recessed portion of a central portion of a three-marker combination icon 231 formed into a U shape. As described with reference to FIG. 6, the three-marker combination icon 231 provides a function of obtaining a relative position relationship between the robot (visual sensor) and the workspace by a method for combining positions of three markers each measured by the three single-marker measurement icons 211.

When three-marker measurement is performed, an operator may also arrange three of the same single measurement icon 211. In other words, the operator can operate and set the same marker UI screen 220 illustrated in FIG. 9 in regard to setting of measurement of three markers. In other words, a common UI screen is used in setting of each of the three markers 4.

Herein, since setting items are common in the setting of the three markers, setting information input to the single-marker measurement icon 211 for one marker may be reflected as a default value in setting information on the other two single-marker measurement icons 211. For example, in a case of the example of the setting items described above illustrated in FIG. 9, a setting item other than the two positions for the stereo measurement can have a common content.

In this way, according to the present embodiment, when three-marker measurement is performed, setting can also be performed via a UI screen common to that when single-marker measurement is performed, and setting information input when the single-marker measurement is performed can be reflected as a default value of a set value when the three-marker measurement is performed. Therefore, the load on a user when the three-marker measurement is performed can be reduced. In other words, when the user performs the three-marker measurement, the user can perform setting in a manner similar to that in the single-marker measurement, and does not have to have specialized knowledge in order to perform three-marker measurement.

Figures 11, 12:
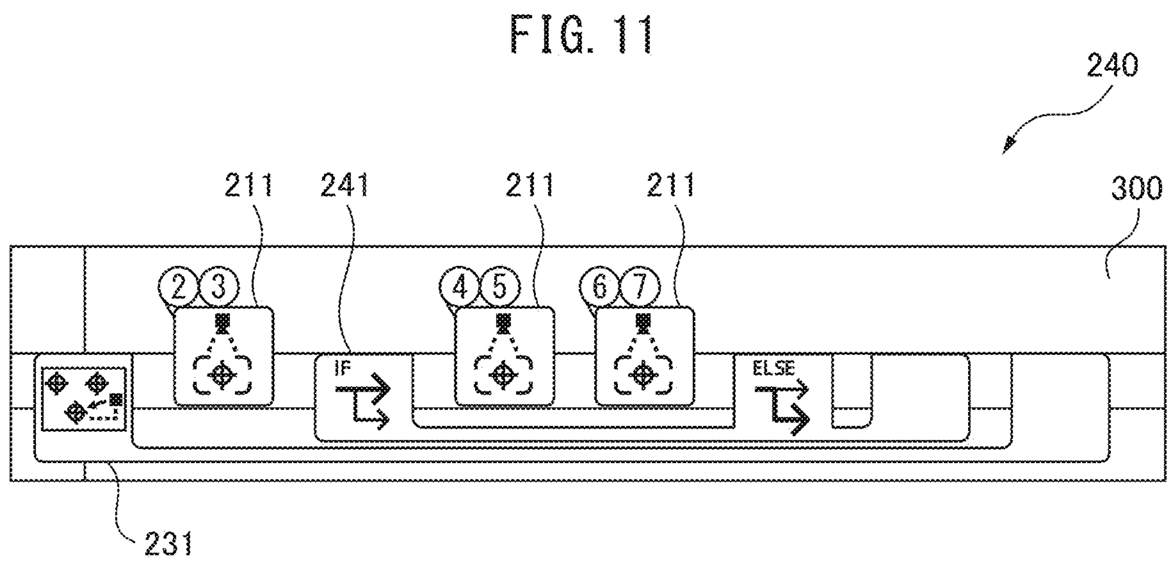
FIG. 11 is a diagram illustrating a measurement program for performing measurement with a first marker, then evaluating a measurement result, and measuring second and third markers when an evaluation value is low.
FIG. 12 is a flowchart illustrating an operation of the measurement program illustrated in FIG. 11.

FIG. 11 illustrates a measurement program 240 for performing measurement with a first marker, then evaluating a measurement result, performing measurement of second and third markers only when an evaluation value is low (i.e., when accuracy of measurement is determined to be low), and increasing accuracy of position measurement. The measurement program 240 includes, in the three-marker combination icon 231 having a shape extended in a U shape, the first single-marker measurement icon 211, a conditional branch icon 241, the second single-marker measurement icon 211, and the third single-marker measurement icon 211. The conditional branch icon 241 is set in such a way as to provide an operation of performing measurement on the second and third markers when an index value of an error by Expression (1) described above is greater than a threshold value, and not performing measurement of the second and third markers when the index value of the error is equal to or less than the threshold value. In this way, according to the present embodiment, when accuracy cannot be acquired with one marker, an operation of shifting to measurement with a plurality of markers can be easily achieved. In other words, when accuracy cannot be acquired with one marker, the measurement can be seamlessly switched to measurement with a plurality of markers.

FIG. 12 illustrates, as a flowchart, an operation of the measurement program 240 illustrated in FIG. 11. First, measurement of a first marker is performed (step S1). Next, accuracy of the measurement of the first marker is evaluated (step S2). Herein, an index value of accuracy is obtained from Expression (1) described above. When it is determined that the index value by Expression (1) is equal to or less than a predetermined value and the accuracy is determined to be good (S3: OK), the processing ends. In this case, a relative position relationship between the robot 20 and the workspace can be acquired by using a measurement result of one marker.

When the index value by Expression (1) is greater than the predetermined value and the accuracy is determined to be not good (S3: NG), measurement of a second marker (step S4) and measurement of a third marker (step S5) are performed. Then, as described with reference to FIG. 6, a coordinate system of the workspace is obtained by combining measurement results of the three markers, and a relative position relationship between the robot 20 and the workspace is acquired (step S6).

Note that three markers 4 may be disposed in advance in the workspace (machine tool 10), or a user may increase the number of the markers 4 when accuracy of measurement with one marker is determined to be not good (S3: NG). Note also that when the user increases the number of the markers 4, the user sets arrangement information on the added marker 4 by operating the teaching device 50.

In the flowchart described above, step S1 corresponds to the first single-marker measurement icon 211 of the measurement program 240, step S4 corresponds to the second single-marker measurement icon 211 of the measurement program 240, and step S5 corresponds to the third single-marker measurement icon 211 of the measurement program 240. An operation of obtaining a relative position in step S6 corresponds to the function of the three-marker combination icon 231, and control of the flow by step S3 of condition determination corresponds to the function of the conditional branch icon 241.

FIG. 13 illustrates a measurement program 250 being a program example of adding a way point between the single-marker measurement icons 211 when measurement is performed with three markers. In the present example, three single-marker measurement ions 211 are disposed in the three-marker combination icon 231, and a linear movement icon 251 for adding a way point is inserted between the first single-marker measurement icon 211 and the second single-marker measurement icon 211. In this case, the robot 20 operates via a teaching point specified by the linear movement icon 251 between a measurement position of the first marker and a measurement position of the second marker. Thus, when there is an obstacle or a singularity on a path from the measurement position of the first marker to the measurement position of the second marker, the obstacle or the singularity can be avoided. In this way, an icon for each measurement is separated even when measurement of a plurality of markers is performed, and thus flexible programming in such a way as to add a way point and the like can be performed.

The operation example when detailed setting related to marker measurement is performed via the programming function provided by the program creation unit 151 is described above. The teaching device 50 includes the setting unit 154 that provides a function of receiving various setting inputs related to teaching of a robot. Setting related to marker measurement may be performed via such a setting input function (i.e., the function of the setting unit 154) of the teaching device 50.

FIG. 14A illustrates an example of a marker setting input screen 500 for marker measurement being provided as the function of the setting unit 154. The marker setting input screen 500 includes an input field 511 for specifying a marker number to be measured, an input field 512 for specifying a measurement method, and input fields 513 and

514 for inputting a measurement position. In the example in FIG. 14A, since measurement by the stereo measurement method is specified for one marker, the input fields 513 and 514 for two measurement positions (measurement position 1, measurement position 2) are disposed. A user can select teaching buttons 513*a* and 514*a* and teach the measurement positions.

When the marker number is specified as 2 in the marker setting input screen 500 illustrated in FIG. 14A, input fields 515 and 516 for inputting measurement positions of a second marker additionally appear as illustrated in a marker setting input screen 500B in FIG. 14B. The user can select teaching buttons 515*a* and 516*a* and teach the measurement positions of the second marker. When the user has already performed a setting input of the first marker via the marker setting input screen 500, information input as setting information on the first marker (marker 1) via the marker setting input screen 500 is reflected in a usable state in the marker setting input screen 500B. In this way, according to the setting function for marker measurement by the setting unit 154, setting can be easily shifted to setting of measurement of two markers by changing a marker number to 2 in a drop-down menu of a marker number in the marker setting input screen.

Setting information on marker measurement being input via the marker setting input screen 500 or the marker setting input screen 500B is copied and stored in a global memory region that can be referred from a program. When a marker measurement command is included in a control program, the marker measurement command can perform an operation for marker measurement by using setting information in the global memory region described above.

Figure 15:
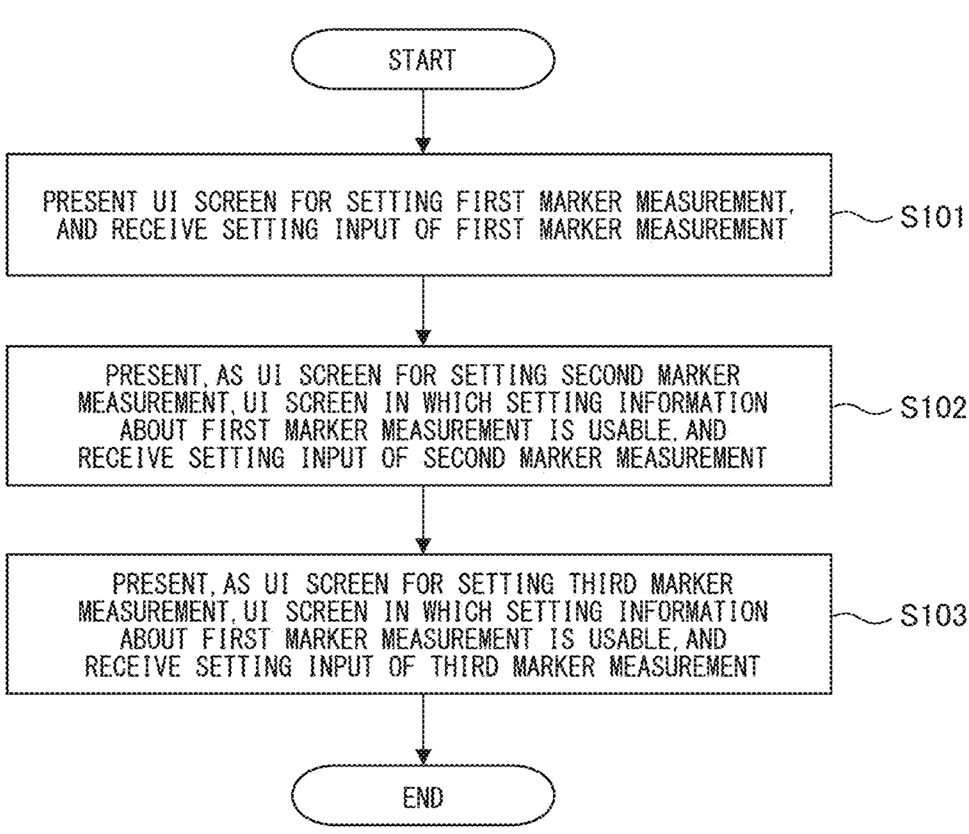
FIG. 15 is a flowchart illustrating an operation of providing an interface for inputting marker measurement setting, and receiving a setting input.

FIG. 15 illustrates, as a flowchart, an operation of providing an interface for inputting marker measurement setting and receiving a setting input by the marker UI creation unit 152 and the marker setting input reception unit 153 of the teaching device 50. Herein, an operation of the marker UI creation unit 152 and the marker setting input reception unit 153 in a case of a program for measuring three markers as illustrated in FIG. 10 will be described.

First, the marker UI creation unit 152 presents the marker UI screen 220 for performing a setting input of first marker measurement, and the marker setting input reception unit 153 receives the setting input for the first marker measurement via the marker UI screen 220 (step S101). Next, the marker UI creation unit 152 presents the marker UI screen 220 for performing a setting input of second marker measurement (step S102). In this case, the marker UI creation unit 152 reflects, as a default value, a value being already input as the setting of the measurement of the first marker in the marker UI screen 220 for the measurement of the second marker. Then, the marker setting input reception unit 153 receives a setting input for the second marker measurement via the marker UI screen 220 for the second marker (step S102). Since a value being already input for the first marker is reflected and usable in the marker UI screen 220 for the second marker, a user may set only an item (for example, a measurement position of the second marker) particularly needed for setting the second marker measurement.

Next, the marker UI creation unit 152 presents the marker UI screen 220 for performing a setting input of third marker measurement, and the marker setting input reception unit 153 receives the setting input for the third marker measurement via the marker UI screen 220 for the third marker (step S103). Also in this case, since a value being already input for the first marker and the second marker is reflected and usable in the marker UI screen 220 for the third marker, the user may set only an item (for example, a measurement position of the third marker) particularly needed for setting the third marker measurement.

In this way, the function of the marker UI creation unit 152 and the marker setting input reception unit 153 achieves the operation of providing the user interface that receives an input of first setting information on measurement of a first marker, and receives an input of second setting information on measurement of a second marker in such a way as to be capable of using the first setting information being input for the first marker. Note that the setting unit 154 can also perform an operation similar to the operation above.

The function provided by the teaching device 50 in the embodiment described above can also be expressed as follows. In other words, a teaching device is used for creating a program for measuring a marker installed in a workspace by a visual sensor. The teaching device includes a user interface creation unit (the marker UI creation unit 152 or the setting unit 154) that creates a user interface for inputting setting information on measurement of the marker. The user interface creation unit sets first setting information input for a first marker to be usable in setting related to a second marker in the user interface.

The marker measurement method (FIG. 11, FIG. 12, and the like) in the embodiment described above can be expressed as follows. In other words, a marker measurement method is one used for measuring a marker installed in a workspace by a visual sensor. The marker measurement method includes: performing measurement on a first marker; evaluating accuracy of a measurement result of the first marker; and performing measurement on one or more additional markers when the accuracy of the measurement result of the first marker is less than a predetermined level. Setting information on measurement of the first marker is usable as setting information on each measurement of the one or more additional markers.

According to the present embodiment, in a situation where measurement of a plurality of markers is needed, a user can also easily perform setting of measurement of a plurality of markers by a method similar to that when setting of measurement of one marker is performed.

The present invention has been described above by using the typical embodiments, but it will be understood by those of ordinary skill in the art that changes, other various changes, omission, and addition may be made in each of the embodiments described above without departing from the scope of the present invention.

In the embodiment described above, the teaching device 50 is formed as a programming device that can perform programming using an icon, but the teaching device 50 may be formed as a programming device that can perform programming on a text base. The program on the text base corresponding to the command icon for measuring three markers illustrated in FIG. 10 is indicated below.

(Example of Measurement Program)

```
FIND MARKER
FIND MARKER
FIND MARKER
CALCULATE MARKERS
```

In the measurement program described above, the command "FIND MARKER" is a measurement command for performing measurement of one marker, and corresponds to the single-marker measurement icon 211 described above. Further, the command "CALCULATE MARKERS" is a command for combining measurement results of three markers and obtaining a relative position relationship between a robot and a workspace, and corresponds to the three-marker combination icon 231 described above. An input of detailed setting for the commands may be performed via a user interface screen for a setting input of marker measurement by a method similar to that in the embodiment described above. Alternatively, the commands may be configured to, when executed by a processor, obtain detailed settings by referring to setting information copied in a global memory region.

The functional block of the teaching device or the robot controller illustrated in FIG. 3 in the embodiment described above may be achieved by executing various types of software stored in a storage device by the CPU of the teaching device or the robot controller, or may be achieved by a configuration in which hardware such as an application specific integrated circuit (ASIC) is a main body.

The program (including the measurement program illustrated in FIG. 12 and the program of the operation of providing the user interface illustrated in FIG. 15) executing various types of processing in the embodiment described above can be recorded in various computer-readable recording media (for example, a ROM, an EEPROM, a semiconductor memory such as a flash memory, a magnetic recording medium, and an optical disk such as a CD-ROM and a DVD-ROM).

REFERENCE SIGNS LIST

4 Marker
10 Machine tool
20 Robot
30 Robot controller
31 Processor
32 Memory
33 Input/output interface
34 Operating unit
50 Teaching device
51 Processor
52 Memory
53 Display unit
54 Operating unit
55 Input/output interface
71 Visual sensor
100 Robot system
131 Storage unit
132 Operation control unit
133 Marker position measurement unit
134 Relative position calculation unit
135 Measurement accuracy evaluation unit
200 Icon display region
211 Single-marker measurement icon
220 Marker UI screen
230 Three-marker measurement icon
300 Program creation region
400 Program creation screen
500, 500B Marker setting input screen

The invention claimed is:

1. A teaching device used for creating a program for measuring a marker installed in a workspace by a camera, the teaching device comprising:
- a processor configured to create a user interface for inputting setting information on measurement of the marker, wherein
- the processor is configured to set first setting information input for a first marker to be usable in setting related to a second marker in the user interface,
- the user interface includes
  - a first user interface screen for setting related to the first marker, and
  - a second user interface screen for setting related to the second marker, and
- the first setting information is at least partially set as a default value in the second user interface screen.

2. The teaching device according to claim 1, wherein
- the first user interface screen and the second user interface screen include a common setting item.

3. The teaching device according to claim 1, wherein
- the processor is configured to generate a program creation screen for creating the program, and
- a first measurement command for measuring the first marker and a second measurement command for measuring the second marker are disposed as the same command in the program creation screen.

4. The teaching device according to claim 3, wherein
- the first measurement command and the second measurement command are represented by the same icon.

5. A marker measurement method for measuring a marker installed in a workspace by a camera, the marker measurement method comprising:
- performing measurement of a first marker;
- evaluating accuracy of a measurement result of the measurement of the first marker; and
- in response to the accuracy of the measurement result of the first marker being less than a predetermined level, performing measurement of one or more additional markers, wherein
- setting information on the measurement of the first marker input via a first user interface screen is usable as setting information on each measurement of the one or more additional markers on one or more additional user interface screen.

6. The marker measurement method according to claim 5, further comprising:
- combining measurement results of the measurement of the first marker and the measurement of the one or more additional markers, and
- obtaining a relative position relationship between the workspace and the camera.

7. A non-transitory computer readable storage medium storing instructions that, when executed by a processor of a computer, causes the processor to provide a user interface configured to:
- receive an input of first setting information on measurement of a first marker, and
- receive an input of second setting information on measurement of a second marker in such a way as to be capable of using the first setting information being input for the first marker, wherein
- the user interface includes
  - a first user interface screen for setting related to the first marker, and
  - a second user interface screen for setting related to the second marker, and
- the first setting information is at least partially set as a default value in the second user interface screen.

8. The non-transitory computer readable storage medium according to claim 7, wherein
- the first user interface screen and the second user interface screen include a common setting item.

9. The teaching device according to claim 1, wherein
- the first setting information set as the default value in the second user interface screen includes at least one of an exposure time of a camera, a selection of the marker, and a dot interval of the marker.

10. The teaching device according to claim 1, wherein the second user interface screen has a same configuration as the first user interface screen.

11. The non-transitory computer readable storage medium according to claim 7, wherein the second user interface screen has a same configuration as the first user interface screen.

* * * * *